United States Patent
de los Reyes

(10) Patent No.: US 8,560,763 B2
(45) Date of Patent: Oct. 15, 2013

(54) DEVICES, SYSTEMS AND METHODS FOR TIME-SENSITIVE DATA AND LIMITED-PERSISTENT STORAGE

(75) Inventor: Gustavo de los Reyes, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 941 days.

(21) Appl. No.: 12/613,811

(22) Filed: Nov. 6, 2009

(65) Prior Publication Data

US 2011/0113182 A1 May 12, 2011

(51) Int. Cl.
- G06F 12/00 (2006.01)
- G06F 13/00 (2006.01)
- G06F 13/28 (2006.01)
- G06F 1/26 (2006.01)
- G06F 11/00 (2006.01)
- G11C 5/14 (2006.01)
- G08B 13/00 (2006.01)
- G08B 21/00 (2006.01)
- G08B 29/00 (2006.01)

(52) U.S. Cl.
USPC .............................. 711/103; 365/229; 726/34

(58) Field of Classification Search
USPC ........ 702/60, 63, 64; 365/226, 227, 228, 229; 705/901, 904, 908; 726/26, 34; 713/193, 194, 320
See application file for complete search history.

(56) References Cited

U.S. PATENT DOCUMENTS

| | | | |
|---|---|---|---|
| 6,304,948 B1 * | 10/2001 | Motoyama et al. | 711/162 |
| 2006/0189382 A1 * | 8/2006 | Muir et al. | 463/29 |
| 2010/0031088 A1 * | 2/2010 | Nakayama | 714/15 |
| 2010/0106289 A1 * | 4/2010 | Moh et al. | 700/227 |

* cited by examiner

Primary Examiner — Christian P Chace
Assistant Examiner — Gary W Cygiel
(74) Attorney, Agent, or Firm — Hartman & Cann LLC

(57) ABSTRACT

Devices, systems, and methods are disclosed which relate to devices utilizing time-sensitive memory storage. The time-sensitive memory storage acts as normal device memory, allowing the user of the device to store files or other data to it; however the information stored on the time-sensitive memory storage is automatically erased, based on some storage time period. A limited amount of persistent storage is used for names and message headers.

18 Claims, 6 Drawing Sheets

DEVICES, SYSTEMS AND METHODS FOR TIME-SENSITIVE DATA AND LIMITED-PERSISTENT STORAGE

BACKGROUND OF THE INVENTION

1. Field of the Invention

The present invention relates to devices, systems, and methods for securing data on portable network devices. In particular, the present invention relates to devices, systems, and methods making use of time-sensitive storage for securing data on portable network devices.

2. Background of the Invention

In some circumstances, computing devices and their peripherals (like external memory) add mobility at the cost of security. It's unlikely a user will ever lose their desktop computer, but a portable smart-phone the size of a paperback, a memory stick the size of a pack of chewing gum, or even a laptop computer is at risk of loss or theft. According to "Information Week", the annual number of cellular telephones lost in cabs in New York City alone is over 63,000.

Such risks encompass not only the loss of the devices themselves but also the loss of the information stored on the devices. These risks can be greatly magnified when the devices store enterprise data, such as corporate planning documents or medical records, in which case any confidential information lost could threaten whole organizations or communities.

Recognition of the potential threat of lost mobile devices to confidential information stored on them has led mobile device manufacturers to add functionality to protect information stored on the devices from being disclosed in the event of loss of the device. Common techniques to protect information include password encrypting all or part of the memory storage of the device and sending "kill packets" to the mobile device which instruct it to erase the contents of its memory storage. However, all these techniques present disadvantages. Password-encryption of memory storage causes big problems if the password is lost, and is not at all effective if the party from whom the enterprise is attempting to keep the confidential information has the password (for example, in the event information is trying to be kept from a former employee). Sending the mobile device "kill packets" is effective only if the device is able to maintain a connection to a communications network.

Thus there is a need for devices, systems, and methods of protecting confidential information stored on mobile devices which address the shortcomings present in the conventional arts.

SUMMARY OF THE INVENTION

The present invention discloses systems, methods, and devices utilizing time-sensitive memory storage. The time-sensitive memory storage acts as normal device memory, allowing the user of the device to store files or other data to it; however the information stored on the time-sensitive memory storage is automatically erased, based on some storage time period. Exemplary embodiments include a limited amount of persistent memory.

In one exemplary embodiment, this storage time period is configurable by an administrator of the time-sensitive memory device. In one exemplary embodiment, the storage time period applies to the complete contents of the time-sensitive memory, so that the complete contents of the time-sensitive memory storage are erased every time the storage time period elapses. In another exemplary embodiment, the storage time period applies only to each piece of information stored on the time-sensitive memory. Each piece of information is erased only after the storage time period has elapsed from the time at which that piece of information was initially stored on the time-sensitive memory storage.

In one exemplary embodiment, the time-sensitive memory storage is housed in a portable network device. In this embodiment, confidential information is only able to be stored on the time-sensitive memory storage of the device, and the time-sensitive memory storage is erased even if the device is powered down. In this manner, such a portable network device implements a security system in case the device is lost or stolen, because any sensitive information contained on the device is erased after the storage time period has elapsed.

In one further exemplary embodiment, the portable network device with time-sensitive memory storage is in communication with an enterprise server. The enterprise server stores application files and bodies of messages and stores and runs applications on behalf of the user of the portable network device. In this embodiment, information received from the enterprise server is stored on the time-sensitive memory of the portable network device and nowhere else on the device. In this embodiment, the portable network device is a "thin client" in the sense that data processing functions for the device are implemented by applications running on the enterprise server, which then send information to and receive user input from the device—for example, sending the body of a message for display on the device.

In one exemplary embodiment, the present invention is a memory management module. The memory management module includes a time-sensitive memory processor, a time-sensitive memory storage in communication with the time-sensitive memory processor, storing a confidential information, and a time-sensitive memory ROM in communication with the time-sensitive memory processor. The confidential information stored on the time-sensitive memory storage is erased every time a specified time period elapses.

In another exemplary embodiment, the present invention is a method of making a plurality of confidential information available to a portable network device. The method includes storing the confidential information on an enterprise server, downloading the confidential information only to a time-sensitive memory storage of the portable network device, and erasing the confidential information when a time period has elapsed. The confidential information stored on the time-sensitive memory storage is erased every time a specified time period elapses.

In yet another exemplary embodiment, the present invention is a system of making a plurality of confidential information available. The system includes a portable network device equipped with a time-sensitive memory storage, and an enterprise server storing the plurality of confidential information in communication with the portable network device via a network. The portable network device downloads the confidential information to the time-sensitive memory storage. The confidential information stored on the time-sensitive memory storage is erased every time a specified time period elapses.

DETAILED DESCRIPTION OF THE INVENTION

Figure 1:
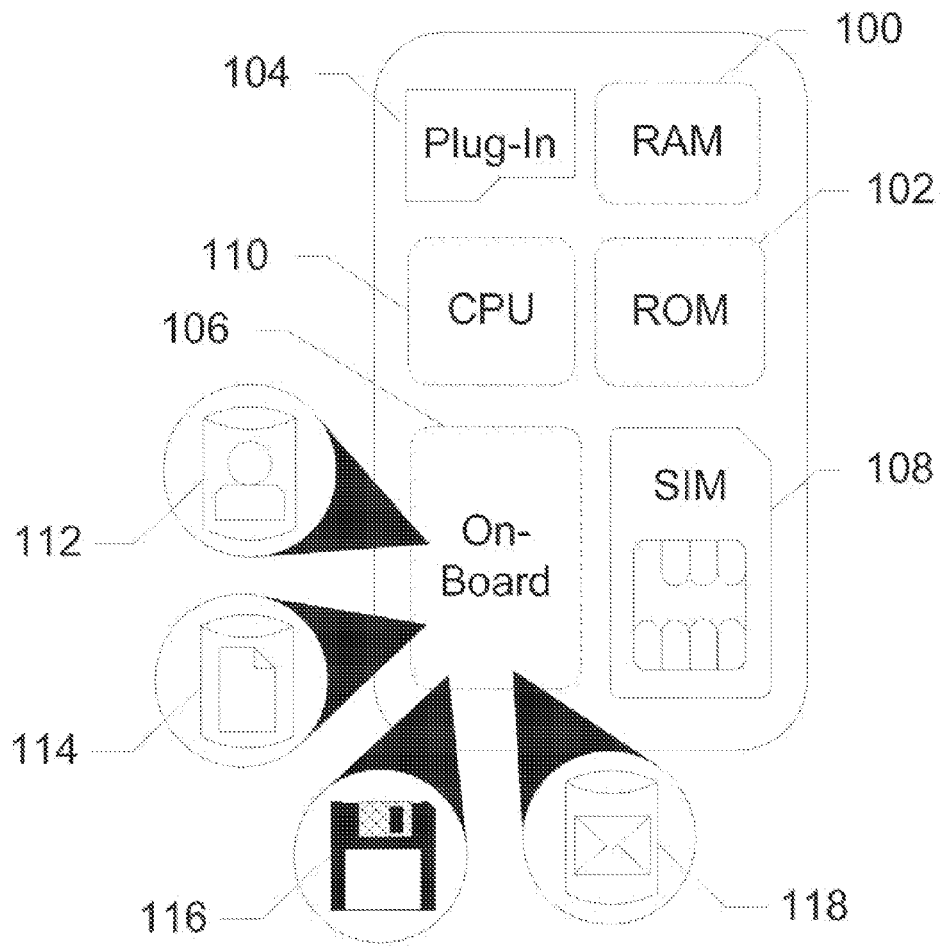
FIG. 1 shows the different forms of memory storage contained in a typical smart-phone.

The present invention discloses systems, methods, and devices utilizing time-sensitive memory storage. The time-sensitive memory storage acts as normal device memory, allowing the user of the device to store files or other data to it; however the information stored on the time-sensitive memory storage is automatically erased, based on some storage time period.

In exemplary embodiments, this storage time period is configurable by an administrator of the time-sensitive memory device. In one exemplary embodiment, the storage time period applies to the complete contents of the time-sensitive memory, so that the complete contents of the time-sensitive memory storage are erased every time the storage time period elapses. In another exemplary embodiment, the storage time period applies only to each piece of information stored on the time-sensitive memory. Each piece of information is erased only after the storage time period has elapsed from the time at which that piece of information was initially stored on the time-sensitive memory storage.

In one exemplary embodiment, the time-sensitive memory storage is housed in a portable network device. In this embodiment, confidential information is only able to be stored on the time-sensitive memory storage of the device, and the time-sensitive memory storage is erased even if the device is powered down. In this manner, such a portable network device implements a security system in case the device is lost or stolen, because any sensitive data contained on the device is erased after the storage time period has elapsed.

In one further exemplary embodiment, a portable network device with time-sensitive memory storage is in communication with an enterprise server. The enterprise server stores application files and bodies of messages and stores and runs applications on behalf of the user of the portable network device. In this embodiment, information received from the enterprise server is stored on the time-sensitive memory of the portable network device and nowhere else on the device. In this embodiment, the portable network device is a "thin client" in the sense that data processing functions for the device are implemented by applications running on the enterprise server, which then send information to and receive user input from the device—for example, sending the body of a message for display on the device.

As used herein and throughout this disclosure, an "administrator" of a device refers to an entity given clearance to affect fundamental characteristics of the operation of the device. As used herein and throughout this disclosure, the "user" of a device refers to the person currently using the device. As used herein and throughout this disclosure, a "portable network device" refers to a portable device capable of establishing and maintaining a connection to a communications network. Examples of portable network devices include smart-phones, cellular telephones, netbooks, laptops, personal digital assistants (PDAs), etc. As used herein and throughout this disclosure, a "name directory" is a list of names of persons with associated contact information. As used herein and throughout this disclosure, "powering off" or "powering down" a device means making the device enter a mode in which almost all of its functions, including the display and the random access memory (RAM), are deprived of energy. As used herein and throughout this disclosure, "flea power" refers to the power the device uses when it is powered off.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 displays the different forms of memory storage contained in a typical smart-phone. Displayed in FIG. 1 are a random access memory storage 100, a read-only memory storage 102, a plug-in storage 104, an on-board storage 106, a subscriber identity module (SIM) card storage 108, and a central processing unit 110. Note that plug-in storage 104, read-only memory storage 102, on-board storage 106, and SIM card storage 108 are persistent storage in the sense that their data contents are maintained even when the device is powered off. Although the primary functions of central processing unit 110 are performing logical functions and instructions stored in, for example, the various other forms of memory loaded onto the smart-phone, central processing unit 110 is included in this list since it is able to store relatively small amounts of data it uses, for example, in central processing unit cache. Random access memory (RAM) storage 100 is a temporary storage which is used to increase the speed at which the smart-phone performs its functions by loading data and instructions in a quickly-accessible location. Applications and files that are currently in use by central processing unit 110 are loaded into the random access memory storage from other forms of storage and purged from random access memory storage 100 when they are no longer in use. Read-only memory (ROM) storage 102 typically stores the device operating system and basic firmware that cannot be changed by the user of the device. On-board storage 106 typically is physically implemented through a hard disk or as flash memory. On-board storage lets the user store a name directory 112, a plurality of files 114, a plurality of programs 116, and a plurality of messages 118. Messages 118 include both short message service (SMS) messages and emails. Plug-in storage 104 is able to be easily inserted into and physically removed from the smart-phone, constituting a highly portable means of storage that interfaces with the smart-phone. Examples of common forms of plug-in storage are microSD cards or USB sticks. SIM card storage 108 is memory storage implemented on the SIM card loaded into the smart-phone. In addition to network connection information, such as the telephone number of the smart-phone or user identification numbers, typically stored in SIM card storage 108. Other forms of information that are typically stored in SIM card storage 108 include SMS messages and name directories.

Figure 2:
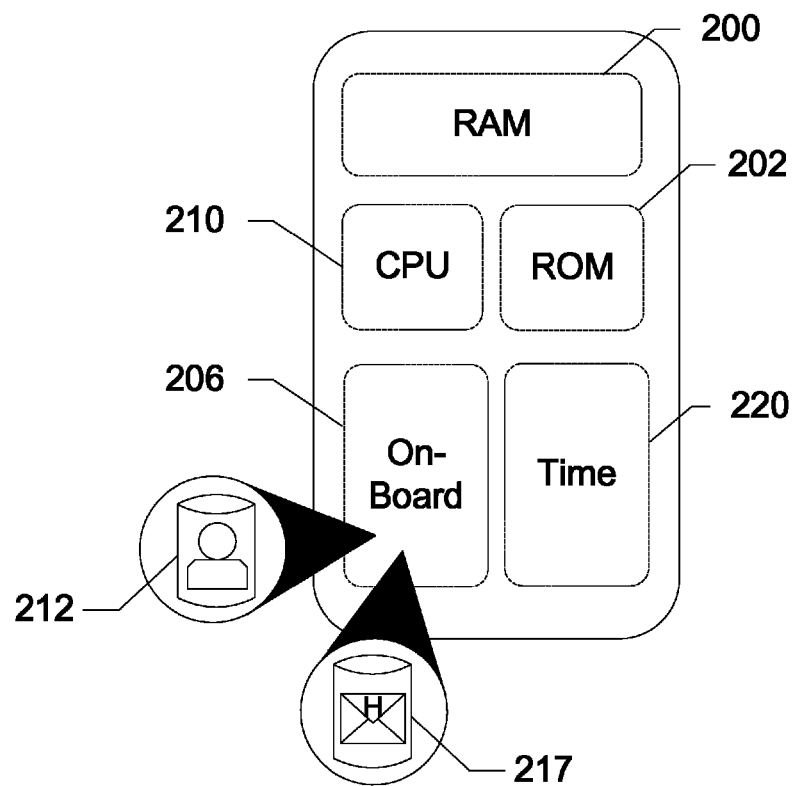
FIG. 2 shows the different forms of memory storage contained in a portable network device equipped with time-sensitive memory storage in one exemplary embodiment of the present invention.

FIG. 2 shows different forms of memory storage contained in a portable network device equipped with time-sensitive memory storage in one exemplary embodiment of the present invention. Eliminated entirely are SIM card storage, aside from storage of any information needed by the device to connect to the network, and plug-in storage. Because these forms of storage are removable, they are especially prone to loss and thus are insecure for confidential information. The small amount of data storage present in central processing unit 210 is not persistent. Similarly, random access memory storage 200 remains because it too is not persistent—therefore, they do not introduce an insecure channel for storing information on the device. Read-only memory storage 202, though persistent, cannot be written to by the user, so does not introduce a channel that enables storing confidential information insecurely. On-board storage 206 is limited to storing a name directory 212 and headers of received SMS or email messages 217. In this embodiment, such a name directory is created through a simple text editor that allows the user to enter and store contact information to on-board storage 206. The user is not able to install programs to the device—limiting the potential that a malicious program is installed on the device. Novel to the device is a time sensitive memory storage 220, able to store files for viewing, bodies of messages, etc. In this embodiment, all of the contents of time sensitive memory storage 220 are deleted on a periodic basis. In this embodiment, this time period is configurable by an administrator, but not necessarily a user, of the device. With these changes, this device securely stores confidential information, because in case of loss, any confidential information is necessarily stored in time sensitive memory storage 220, which is erased periodically.

In an alternative embodiment, each piece of data stored on the time sensitive memory storage is deleted a fixed amount of time after the time at which it is stored on the time sensitive memory storage. Such operation constitutes deletion on a "rolling" basis.

Figure 3:
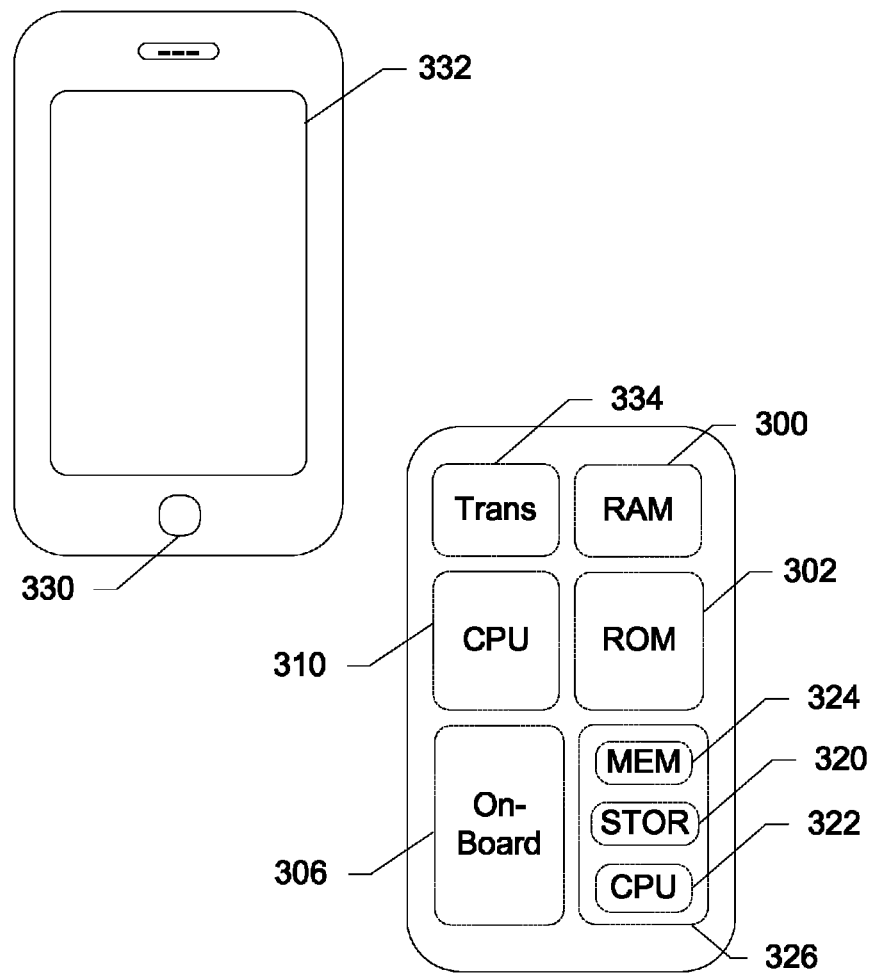
FIG. 3 shows a schematic diagram of the device architecture of a portable network device equipped with a time-sensitive memory storage in one exemplary embodiment of the present invention.

FIG. 3 shows a schematic diagram of the device architecture of a portable network device equipped with a time-sensitive memory storage 322 in one exemplary embodiment of the present invention. Note the two processors in FIG. 3: a central processing unit 310 responsible for the overall operation of the portable network device and a time-sensitive memory storage processor 322 responsible only for the administration of the security of the time-sensitive memory storage 320. In this embodiment, such administration includes allowing an administrator of the device to set a period over which written data persists on time-sensitive memory storage 320; erasing the contents of time sensitive memory storage 320 periodically, based on the pre-set period; and determining if the energy remaining in the battery of the device goes below the amount of flea power required to erase time sensitive memory storage 320—in which case, time sensitive memory processor 322 powers off the device. In this embodiment, forms of device memory present in the portable network device include a device ROM storage 302, storing the device operating system and basic firmware needed for the operation of the device; a RAM storage 300 providing a temporary storage for instructions and data currently in use by central processing unit 310; a limited on-board storage 306, allowing the user to store a name directory and headers of emails and SMS messages; a time-sensitive memory read-only memory 324 and time sensitive memory storage 320, to which central processing unit 310 is able to write confidential information, including files and bodies of emails or SMS messages, for viewing. Additionally, the device includes an input 330 and a display 332, allowing for user input to the device, and a transceiver 334. Together, time-sensitive memory storage 320, time-sensitive memory processor 322, and time-sensitive memory ROM 324 constitute a time-sensitive memory management module 326. Time-sensitive memory read-only memory 324 stores the basic firmware needed for the operation of time-sensitive memory management module 326. In this embodiment, because the operations of time-sensitive memory processor 322 are so simple, RAM is not required for the operation of time-sensitive memory management module 326. The instructions stored in time-sensitive memory ROM 324 and data needed for the operation of time-sensitive memory storage 320 are loaded directly onto the cache of time-sensitive memory processor 322. In this embodiment, time-sensitive memory processor 322 loads an algorithm which tracks the time elapsed since time-sensitive memory storage 320 was last erased and the level of energy remaining in the battery of the device. When the time elapsed equals the pre-set period, time-sensitive memory processor 322 erases the complete contents of time-sensitive memory storage 320. Simultaneously, the algorithm monitors the energy remaining in the device battery and if it drops below a pre-set threshold equal to the maximum amount of energy needed to erase the contents of time-sensitive memory device 320 (including the energy used by the time-sensitive memory processor in tracking the time elapsed), time-sensitive memory processor 322 instructs central processing unit 310 to power off the device. This conserves the remaining flea power for the operation of time-sensitive memory management module 326, so that the algorithm implemented by time-sensitive memory processor 322 continues, even while the device is powered down. Note that the pre-set threshold need not be very high, because once the device is powered down, time-sensitive memory storage 320 will be erased at most once before the device is re-charged.

In an alternative embodiment of the present invention, the algorithm implemented by the time-sensitive memory processor tracks the time since each piece of data was loaded onto the time-sensitive memory storage and erases only that piece of data when its time elapsed equals the pre-set period.

Figure 4:
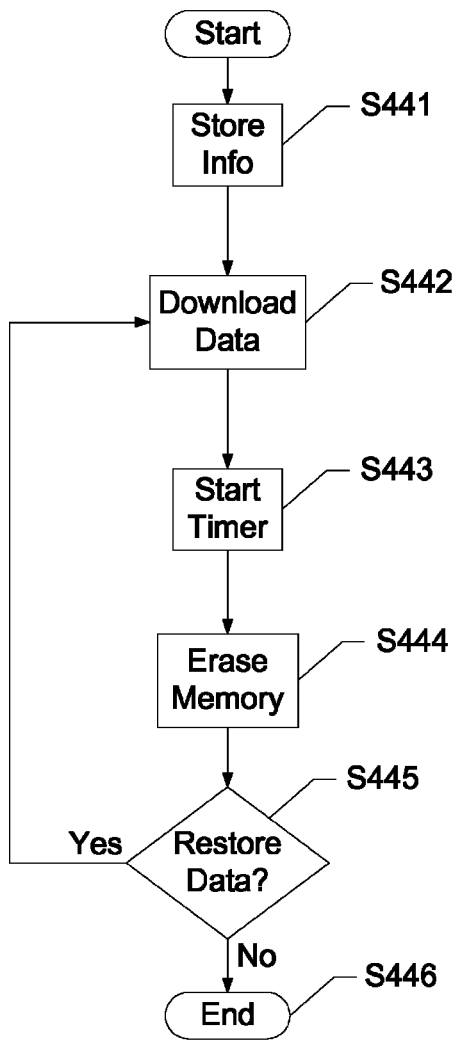
FIG. 4 shows a method of making confidential information available to a portable network device in one exemplary embodiment of the present invention.

FIG. 4 shows a method of making confidential information available to a portable network device with a time-sensitive memory management module, including a time-sensitive memory storage, in one exemplary embodiment of the present invention. As outlined in the background, storing confidential information on portable network devices presents challenges to the security of the confidential information. A plurality of confidential information is stored on a secure enterprise server, S441. Such confidential information includes files and bodies of messages. After authenticating the portable network device, some portion of this confidential information is downloaded to the time-sensitive memory storage of the portable network device, S442. A timer starts, S443. At some later time, when the elapsed time equals some pre-set period, the downloaded confidential information is erased from the time-sensitive memory storage and the user of the portable network device is notified of the erasure, S444. The user is queried if they want the erased data restored, S445. If the user indicates "yes", the method returns to S442. If the user indicates "no", the method terminates, S446.

Figure 5:
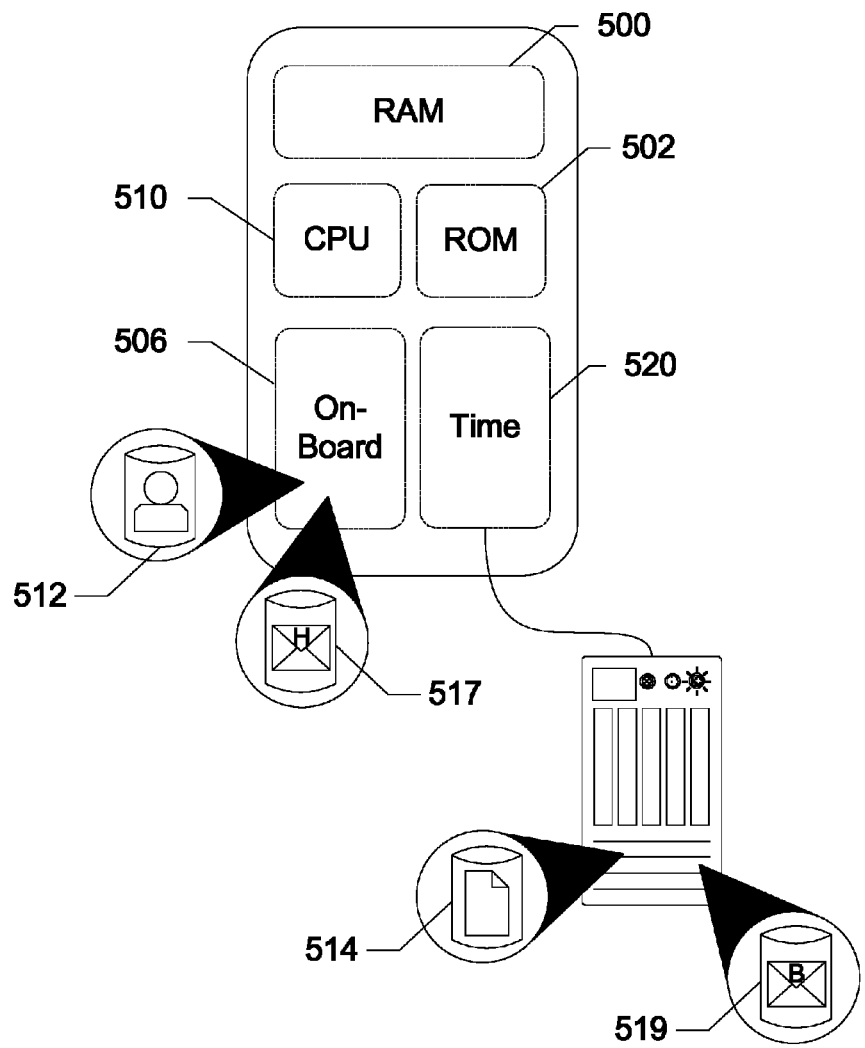
FIG. 5 shows the different forms of memory storage available to a portable network device equipped with a time-sensitive memory storage and in communication with an enterprise server in one exemplary embodiment of the present invention.

FIG. 5 shows the different forms of memory storage available to a portable network device equipped with a time-sensitive memory storage 520 and in communication with an enterprise server in one exemplary embodiment of the present invention. Such a device herein and throughout this disclosure will be referred to as a "time-sensitive memory enterprise device". The available forms of memory are the same as those available to the device of FIG. 2, with one important addition. As with the device of FIG. 2, the time-sensitive memory enterprise device contains a RAM storage 500; a ROM storage 502; a central processing unit 510; a limited on-board storage 506, storing a name directory 512 and headers of SMS or email messages 517; and a time-sensitive memory storage 520 which deletes itself automatically. However, the time-sensitive memory enterprise device is in communication with an enterprise server through which the time-sensitive memory enterprise device downloads confidential information, such as files 514 or bodies of messages 519, for view, to time-sensitive memory storage 520. In this embodiment, the networked time-sensitive memory device is a "thin client", so that, as well, applications running on the enterprise server interface with and are accessible to the time-sensitive memory enterprise device. Because confidential information is only stored in time-sensitive memory storage 520, any confidential information stored on the device will be deleted even if the device is not powered off or unavailable to the network, providing some measure of security in case the device is lost or stolen. Because the user is able to download confidential information to time-sensitive memory storage 520, if the connection between the portable network device and the enterprise server is broken, the user still is able to view and use the confidential information.

Figure 6:
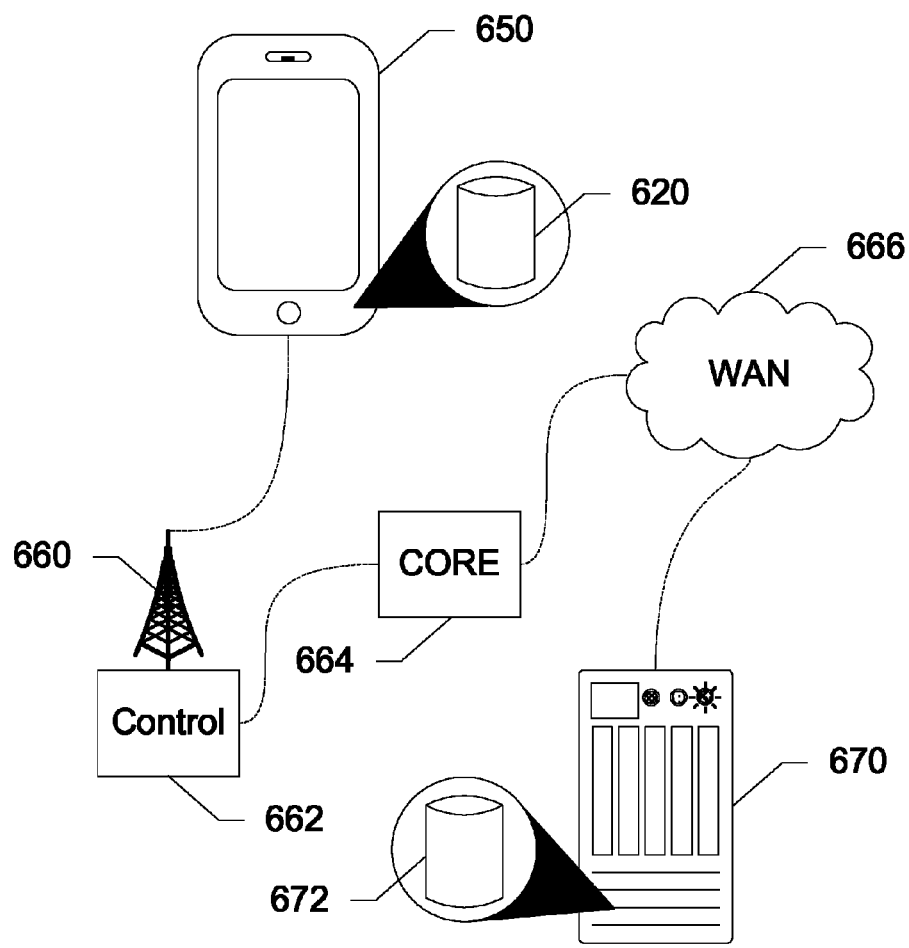
FIG. 6 shows a schematic diagram of the network architecture of a secure system for making confidential information available to a time-sensitive memory enterprise device in one exemplary embodiment of the present invention.

FIG. 6 shows a schematic diagram of the network architecture of a secure system for making confidential information available to a time-sensitive memory enterprise device 650 in one exemplary embodiment of the present invention. Such a system includes time-sensitive memory enterprise device 650, including a time-sensitive memory storage 620; an access point 660; an access point controller 662; a core network infrastructure 664; a wide area network 666; an enterprise server 670; and a server memory 672. Access point 660, access point controller 662, and core network infrastructure 664 enable time-sensitive memory enterprise device 650 to make a connection to wide area network 666. In this embodiment, wide area network 666 is the Internet. Via this connection, time-sensitive memory enterprise device 650 passes enterprise server 670 a device identification number and a user identification number. Enterprise server 670 polls external server memory 672 to determine what confidential information, if any, stored on external server memory 672 time-sensitive memory enterprise device 650 is allowed to download to time-sensitive memory storage 620 and what stored applications, if any, the time-sensitive memory enterprise device 650 is allowed to run and access remotely, based on a comparison between the passed identification numbers and a plurality of stored device and user identification numbers. Based on this determination, a virtual desktop session is established on enterprise server 670, providing access to the allowed confidential information and allowed applications to the time-sensitive enterprise memory device 650. Additionally, the allowed confidential information is made available for download to the time-sensitive memory storage 620 of time-sensitive memory enterprise device 650, for example, for offline viewing. Because such confidential information is only stored in time-sensitive memory storage 620 of time-sensitive memory enterprise device 650, the confidential information has a high degree of security, even in the event of loss or theft, because it is deleted in a fixed time period.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
a first processor that operates the device;
a time-sensitive memory storage that stores confidential information, the time-sensitive memory storage coupled to the first processor;
a second processor that administrates security of the device; and
a time-sensitive memory ROM coupled to the second processor, the time-sensitive memory ROM storing computer-executable instructions that are executed by the second processor to perform operations comprising monitoring a battery level of the device;
tracking a specified time period since the confidential information was stored on the time-sensitive memory storage;
determining that the confidential information stored on the time-sensitive memory storage is to be erased upon determining that the specified time period has elapsed,
determining that the battery level of the device is below a minimum amount of power to erase the confidential information; and
in response to determining that the battery of the device is below the minimum amount, powering off the device, wherein the confidential information comprises a body of a message, and wherein a header of the message is not erased.

2. The device of claim 1, wherein the device is coupled to a portable network device.

3. The device of claim 2, wherein the portable network device comprises a display and an input.

4. The device of claim 3, wherein the portable network device comprises a transceiver.

5. The device of claim 4, wherein the transceiver communicates using one of cellular radio frequency (RF), BLUETOOTH, and WiFi communication.

6. The device of claim 4, wherein the portable network device is in communication with an enterprise server.

7. The device of claim 6, wherein the portable network device downloads the body from the enterprise server and saves the body to the time-sensitive memory storage.

8. The device of claim 1, further comprising a limited persistent storage for a name directory and a plurality of message headers.

9. A method comprising:
storing, by a portable network device comprising a first processor, confidential information on an enterprise server;
downloading, by the first processor, the confidential information;
storing, by the first processor, the confidential information to a time-sensitive memory storage of the portable network device;
monitoring, by the first processor, a battery level of the portable network device;
tracking, by the first processor, a specified time period since the confidential information was stored on the time-sensitive memory storage;
determining, by the first processor, that the confidential information is to be erased upon determining that the specified time period has elapsed;
determining, by the first processor, that the battery level of the portable network device is below a minimum amount of power to erase the confidential information; and
in response to determining that the battery level of the portable network device is below the minimum amount, powering off, by the first processor, the portable network device, wherein the confidential information comprises a body of a message, wherein a header of the message is not erased, and wherein the portable network device further comprises a second processor for operating the portable network device.

10. The method of claim 9, further comprising limiting on-board storage to storing only a name directory and a plurality of message headers.

11. The method of claim 9, further comprising passing the enterprise server a device identification number stored on the portable network device to gain access to the confidential information.

12. The method of claim 9, further comprising prompting a user to restore the confidential information.

13. The method of claim 9, further comprising re-downloading the confidential information only to a time-sensitive memory storage of the portable network device.

14. A system comprising:
a portable network device comprising a first processor for operating the portable network device;
a second processor that administrates security of the device;
a time-sensitive memory ROM;
an enterprise server in communication with the portable network device via a network; and
a time-sensitive memory storage ROM that stores instructions that, when executed by the second processor, cause the second processor to perform operations comprising
downloading confidential information to the time-sensitive memory storage;
tracking a specified time period since the confidential information was downloaded;
determining that the confidential information stored on the time-sensitive memory storage is to be erased upon determining that the specified time period has elapsed;
monitoring a battery level of the portable network device;
determining that the battery level of the portable network device is below a specified amount of flea power to erase the confidential information; and
in response to determining that the battery level of the portable network device is below the minimum amount, powering off the portable network device, wherein the confidential information comprises a body of a message, and wherein a header of the message is not erased.

15. The system of claim 14, wherein the portable network device includes a device identification number.

16. The system of claim 14, wherein the battery provides flea power to the time-sensitive memory storage.

17. The system of claim 14, wherein the portable network device includes a transceiver which uses one of cellular radio frequency (RF), BLUETOOTH, and WiFi communication.

18. The system of claim 14, wherein the portable network device includes a limited persistent storage for a name directory and a plurality of message headers.

* * * * *